United States Patent [19]

Kubis

[11] Patent Number: 4,625,686
[45] Date of Patent: Dec. 2, 1986

[54] COMPACT FRESH-GAS INTAKE SYSTEM FOR ENGINES WITH COMBINATION SUPERCHARGING

[75] Inventor: Heribert Kubis, Nuremberg, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 681,220

[22] Filed: Dec. 13, 1984

[30] Foreign Application Priority Data

Dec. 13, 1983 [DE] Fed. Rep. of Germany ....... 3344950

[51] Int. Cl.[4] .............................................. F02B 27/00
[52] U.S. Cl. ........................ 123/52 MB; 123/52 MV
[58] Field of Search ........ 123/52 M, 52 MV, 52 MC, 123/52 MB, 55 R, 55 V

[56] References Cited

U.S. PATENT DOCUMENTS

| 2,034,144 | 3/1936 | Lauret | 123/52 MV |
| 4,064,696 | 12/1977 | Cser | 123/52 M |
| 4,300,488 | 11/1981 | Cser | 123/52 MB |
| 4,463,711 | 8/1984 | Yoshioka | 123/52 MV |

FOREIGN PATENT DOCUMENTS 2831985 2/1980 Fed. Rep. of Germany ........ 123/52 MB

Primary Examiner—Craig R. Feinberg
Attorney, Agent, or Firm—Becker & Becker, Inc.

[57] ABSTRACT

A fresh-gas intake system for engines with combination supercharging, i.e. exhaust gas turbocharging combined with resonance supercharging. The object is to improve such a system so as to make it very compact. On the one hand, the otherwise usual plenum tank is omitted, and on the other hand the incorporation of the resonance pipes in the integral unit, as well as the supply of the fresh gas, is improved. This is essentially achieved in that at least one resonance tank is formed with such a length that it extends over all of the inlet port openings of all of the in-line cylinders, and in that the fresh gas supplied by the turbocharger is delivered via a supply cover into the resonance pipes.

12 Claims, 6 Drawing Figures

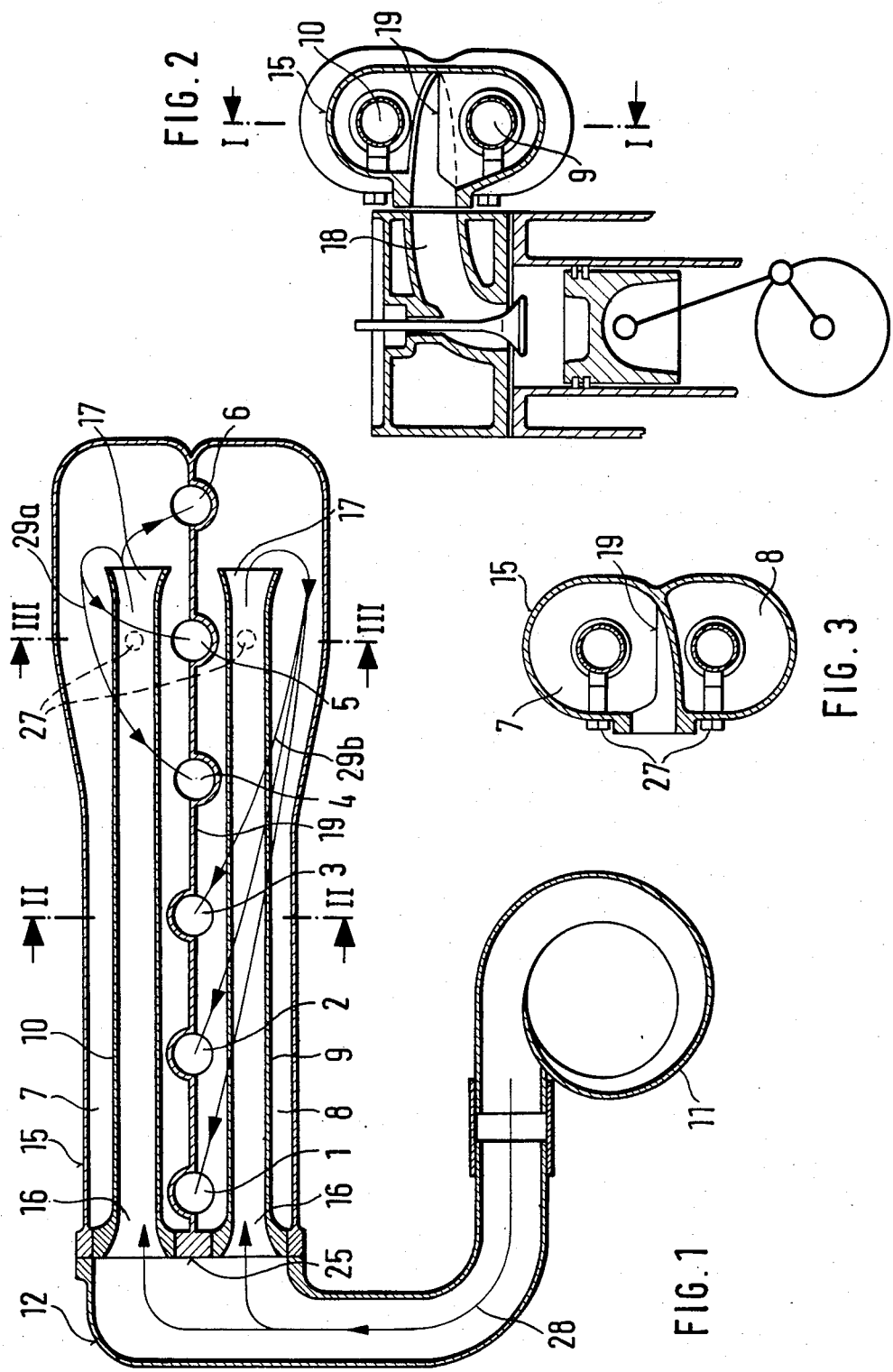

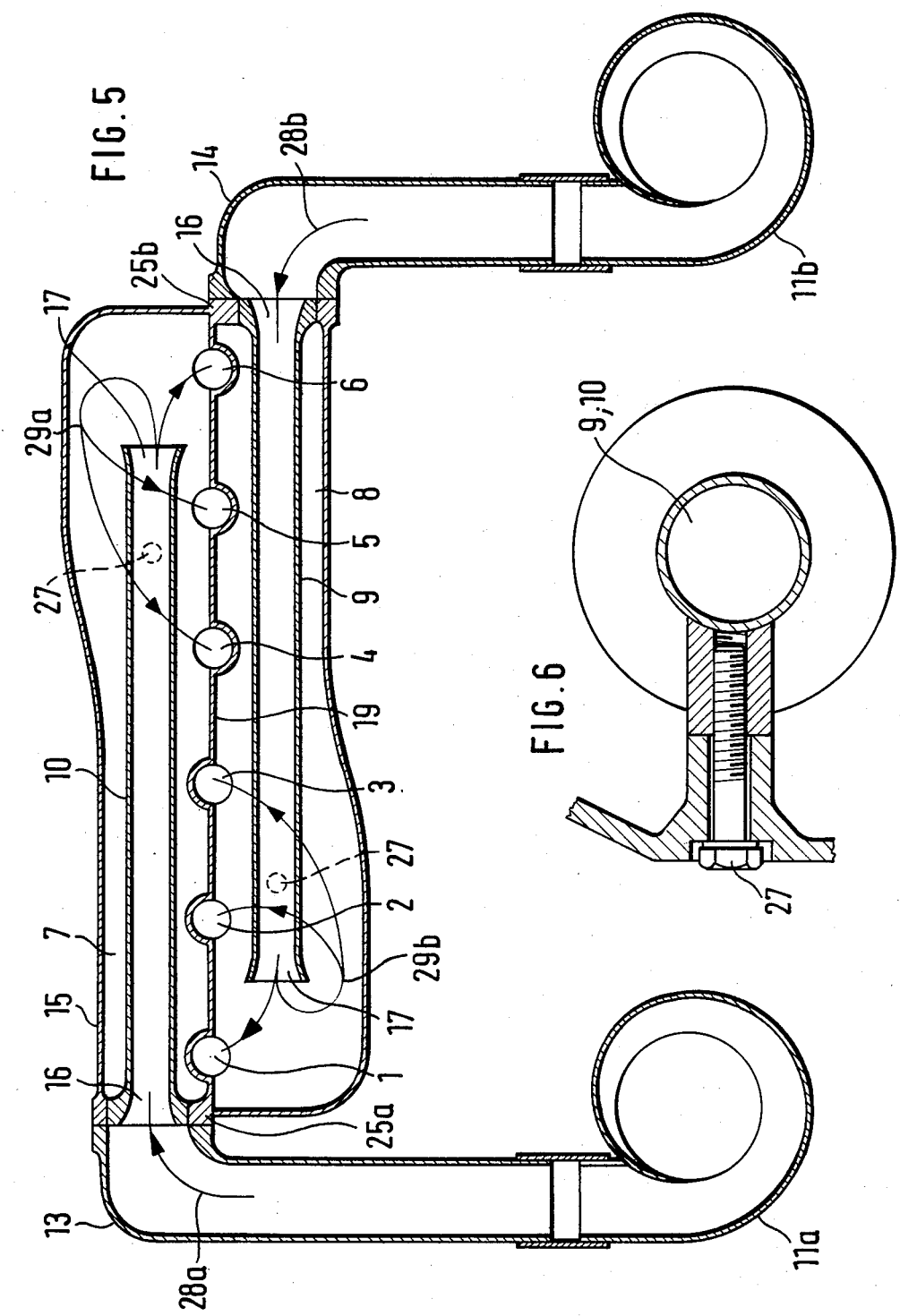

COMPACT FRESH-GAS INTAKE SYSTEM FOR ENGINES WITH COMBINATION SUPERCHARGING

BACKGROUND OF THE INVENTION

1. Field of the Invention

The present invention relates to a fresh-gas or carbureted fuel induction or intake system for turbocharged, in-line, six-cylinder internal combustion engines; the intake or guidance system is arranged between the inlet ports of the cylinders and the supercharging device, and comprises two resonance tanks, each of which individually communicates with the inlet ports of three adjacent cylinders, and the individual volumes of which amount to more than half of, but less than tenfold, the total volume of the three cylinders connected to the respective resonance tank; each resonance tank has associated therewith a resonance pipe, the outlet opening of which opens into the tank, while its inlet opening communicates with the discharge side of the supercharging device; the effective length of each resonance pipe is at least eight times the diameter of a circle having a circular cross-sectional area equivalent to the cross-sectional area of the pipe; the respective resonance tanks with the associated resonance pipes extend in the same direction as the longitudinal axis of the engine.

2. Description of the Prior Art

Fresh-gas intake systems having a combination of exhaust gas turbocharging and resonance supercharging are known (German Pat. No. 22 45 732). They consist of a plenum or compensating tank supplied by the turbocharger, the fresh gas being routed from the plenum tank via two resonance pipes to the resonance tanks which respectively connect the inlet ports of each group of three adjacent cylinders. Such systems have the following drawbacks:

Due to the plenum tanks and resonance pipes being separately arranged from the resonance tanks which are screwed to the cylinder head, there are, in addition to the necessary vibration-resistant and expensive supports, four sealing points which have to seal the resonance system from the outside. These sealing points are expensive because they have to be both gas-tight and oil-tight in view of the general practice of delivering oil-containing engine blowby gases into the fresh gas system.

The externally arranged plenum tanks, and the externally arranged resonance pipes, take up a large amount of space and substantially impair the desirable compactness of the engine envelope which is important in order to make the engine suitable for univeral application.

The externally arranged resonanc pipes increase noise radiation, which is undesirable with a view to satisfying legislation which imposes limitations on noise emission.

The externally arranged resonance pipes generally have to be bent in several planes in order to accommodate them in the crowded space between the resonance and plenum tanks. Bending of the pipes is expensive and problematic, expecially in view of the fact that no creasing is permissible inside the resonance pipes in view of the high flow velocities.

In order to obviate the drawbacks mentioned, systems have been developed where the plenum tanks, resonance pipes, and resonance tanks are combined in one unit; the resonance pipes are generally accommodated in integrated plenum tanks which extend over both resonance tanks in the longitudinal direction of the engine. Such a system was disclosed in German Pat. No. 26 21 638.

Systems of this type are complex, inter alia because of the necessary plenum tank. In the interest of minimizing the physical volume, the integrated resonance pipes have to be made with narrow curvatures which additionally have to blend in with the conically extended throat region, which in most cases can be made only as a casting, so that the resonance pipes—ruling out full-length cast pipes for reasons of excessively rough surfaces, high flow losses, and considerable complexity of the integral casting—have to be "fabricated" from drawn pipes and cast bends at substantial expense. Furthermore, introducing the resonance pipes so fabricated, and securing them in a vibration-resistant manner, inside the unit is complex and expensive.

An object of the present invention is to provide a compact, fresh-gas intake system featuring low flow losses, with the need for an external or integrated plenum tank being eliminated, and with the introduction of the resonance pipes in the integral unit, as well as the supply of the fresh gas, being facilitated.

BRIEF DESCRIPTION OF THE DRAWINGS

This object, and other objects and advantages of the present invention, will appear more clearly from the following specification in conjunction with the exemplary embodiments illustrated in the drawings, in which:

FIG. 1 is a view showing a longitudinal section taken along the line I—I in FIG. 2 through a first embodiment of the inventive fresh-gas intake system on a six-cylinder in-line engine;

FIG. 2 is a section taken along the line II—II in FIG. 1, with the third cylinder partially represented;

FIG. 3 is a view showing a section taken along the line III—III in FIG. 1 through the fresh-gas intake system in the region of the outlet-end fixing of the resonance pipes in the resonance tanks;

FIG. 5 shows a third embodiment of the inventive fresh-gas intake system; and

FIG. 6 is a more detailed representation of the method of fixing the resonance pipes in the resonance tanks (see also FIG. 3).

SUMMARY OF THE INVENTION

Figure 4:
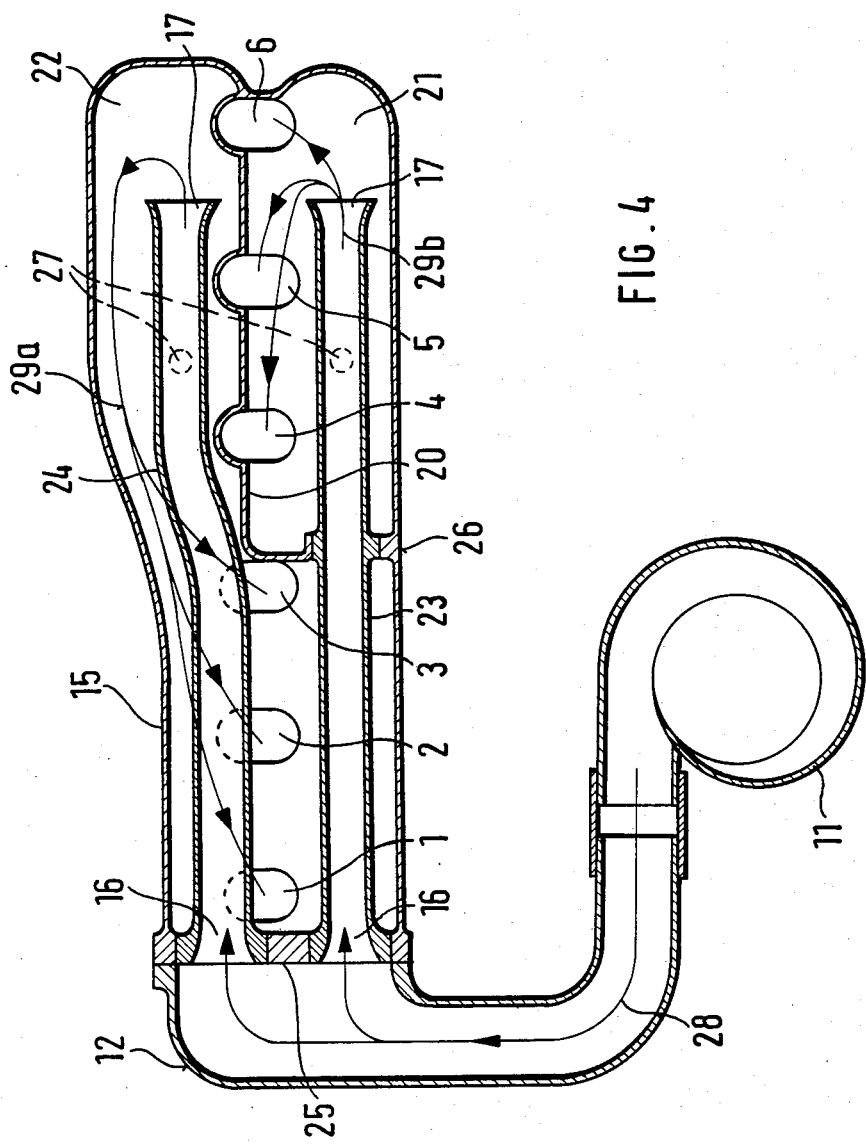
FIG. 4 shows a second embodiment of the inventive fresh-gas intake system.

The intake system of the present invention is characterized primarily in that at least one resonance tank is of such a length that it extends over all of the inlet ports which are arranged in-line, of all of the cylinders, and in that the fresh gas delivered by the supercharging device is delivered into the resonance pipes through a supply device which is in the form of a cover.

According to the present invention, at least one, but normally both, resonance tanks thus extend over the length made up of all six inlet ports of the in-line cylinders. Supply of the fresh gas compressed by the turbocharger is effected via a cover designed for favorable flow conditions. This cover may either be constructed as a single supply cover for both resonance pipes or resonance tanks, or as a separate supply cover for each individual resonance pipe or resonance tank. In the former case, the inlet openings of the (preferably straight) resonance pipes which extend through the interior of the resonance tanks would be arranged on the same side, side by side, in the second case, the inlet openings would be at opposite ends.

Pursuant to one advantageous embodiment, the two resonance tanks are combined in a single resonance box or resonance casing. This results in as compact a construction as possible. Obviously, it is also possible to provide two resonance tanks extending over all six inlet port openings as completely separate castings.

As a further development of the present invention, the supply cover or covers may be disposed parallel to the inlet openings of the resonance pipes in a gas-tight fit either on the inlet end of the integral resonance box which unites the two resonance tanks, or on the respective resonance tank casings.

A specially advantageous construction is provided by subdividing the resonance box into the two resonance tanks by means of a common partition. In order to obtain two resonance tanks of equal volume and equal length, the partition can extend over the length of all six openings of the inlet ports, and parallel to the longitudinal axis of the engine. In this arrangement, the partition is guided around the inlet port openings in such a way that the respective resonance tank communicates with the three allied inlet ports of the respectively adjacent cylinders.

However, the partition can also be arranged—if physical design reasons make this necessary—in such a way that it extends only partially parallel to longitudinal axis of the engine, and subsequently extends transverse to the longitudinal direction of the engine. This results in two resonance tanks of different sizes, with one of the resonance pipes extending fully in the allied resonance tank, and the other resonance pipe extending through both resonance tanks. The resonance pipe which extends through both resonance tanks can be supported and sealed in the partition by means of a sliding fit. In this configuration, it is also possible to provide slightly curved resonance pipes, if this should be absolutely necessary for physical design reasons.

In order to minimize flow losses, the inlet and outlet openings of the resonance pipes are flared and rounded. In addition, the resonance tanks which extend over all six inlet port openings have a diameter, in the region where the flow is deflected at the outlet openings of the resonance pipes, which is greater than the diameter in the region downstream of the point where the flow is deflected; in the latter region, the resonance tanks are disposed closely around the integrated resonance pipes in the interest of a compact construction.

In order to allow for thermal expansion, and to prevent thermal stresses, fastening of the resonance pipes is effected in a simple manner by supporting them, in the region of their inlet openings, with a sliding fit in the resonance box or the resonance tanks and, in the region of their outlet openings, by a fixed fit in the respective resonance tanks. The fixed fit may be formed as a simple screwed joint.

The present invention is not limited to straight six-cylinder engines, but can equally well be applied to each of the two cylinder banks of V12 engines.

DESCRIPTION OF PREFERRED EMBODIMENTS

Referring now to the drawings in detail, and initially to FIGS. 1 to 3, a fresh-gas or carbureted fuel intake or induction system is arranged between the inlet port openings 1 to 6 (or inlet ports 18) of a six-cylinder in-line internal combustion engine, and the discharge side of a turbocharger 11. The intake or guidance system comprises the resonance tanks 7 and 8 in which are arranged the resonance pipes 9 and 10. The resonance tanks 7, 8 are formed as an integral casting 15, and extend over all of the inlet port openings 1 to 6 of all of the in-line cylinders.

The subdivision of the resonance tanks 7 and 8, which are united in the resonance box 15, is effected by means of a common partition 19. This partition extends parallel to the longitudinal axis of the engine, and also over the length of all six inlet port openings 1 to 6; the partition 19 is guided around the inlet port openings 1 to 6 in such a way that the resonance tank 7 communicates with the inlet port openings 4 to 6, and the resonance tank 8 communicates with the inlet port openings 1 to 3 of the associated adjacent cylinders. The volume of the resonance tanks is greater than half the total volume of each group of connected cylinders, but less than ten times this volume. Furthermore, the length of the resonance pipes is greater than eight times the respective inside diameter.

The supply of the fresh-gas, which is compressed in the turbocharger 11, into the resonance pipes 9, 10 (see flow arrows 28) is effected by means of a supply cover 12 which is placed on the inlet side of the resonance box 15 and is sealed gas-tight directly parallel to the inlet openings 16 of the resonance pipes 9, 10. The supply cover 12 is suitably shaped to accomplish a low-loss flow. The resonance tanks 7, 8 have a cross-sectional area in the region where the flow is deflected (in the area of the outlet openings 17 of the resonance pipes 9 and 10) which is wider than the cross-sectional area in the region downstream of the point of flow deflection (see lines 29a and 29b). In addition, the inlet and outlet openings 16, 17 of the resonance pipes 9, 10 are flared.

The connection of the resonance pipes 9, 10 in the resonance tanks 7, 8 is effected in a simple manner by supporting them, in the region of their inlet openings 16 which are arranged at one end, with a sliding fit 25 in the resonance box 15 and, at the opposite end, by having them screwed to the resonance tanks 7, 8 (fixed fit 27).

In the embodiment of the fresh-gas intake system illustrated in FIG. 4, the partition 20 first extends in a direction parallel to, and later transverse to, the longitudinal direction of the engine. In this arrangement, only one resonance tank 22 extends over the length formed by the inlet port openings 1 to 6 of all of the cylinders, whereas the other resonance tank 21 only extends over the inlet port openings 4 to 6 of the three adjacent cylinders. In this variant, the resonance pipe 23 is partially disposed in the resonance tank 22 and partially in the resonance rank 21, and is supported and sealed in the partition 20 by a sliding fit 26. The resonance tank 22, which extends over all six inlet port openings 1 to 6, also has an increased cross-sectional area in the region of the outlet opening 17 of the resonance pipe 24. Furthermore, FIG. 4 also shows that in principle it is possible to adopt slightly curved resonance pipes (see resonance pipe 24) if this is necessary for physical design reasons.

A third embodiment is illustrated in FIG. 5. In this variant, the opposing inlet openings 16 of the resonance pipes 9, 10 are located at the front and rear ends of the resonance box 15, and the supply of the fresh-gas compressed by the turbochargers 11a, 11b (see flow arrows 28a and 28b) is effected via the supply covers 13 and 14. Again, there is a sliding fit 25a, 25b for each resonance pipe 9, 10.

FIG. 6 shows the details of the screwed joint 27 of the resonance pipes to the resonance tanks in the region of the outlets of the resonance pipes.

Finally, it should be mentioned that the proposed fresh-gas intake system can also be applied to each of the two cylinder banks of V12 engines. Since this system completely eliminates the need for a plenum tank, the casting of the resonance box 15 is substantially simplified, and its cost is considerably reduced.

The present invention is, of course, in no way restricted to the specific disclosure of the specification and drawings, but also encompasses any modifications within the scope of the appended claims.

What I claim is:

1. A fresh-gas intake system for turbocharged, in-line, six-cylinder bank of an internal combustion engine, with said system being disposed between and communicating with, a supercharging device and inlet ports of said cylinders; said system comprising:

two resonance tanks, each of which respectively communicates with said inlet ports of three different adjacent cylinders; each of said resonance tanks having a volume being in a range of between one half to ten times a total volume of the three cylinders with which it communicates; each of said resonance tanks having a length and a common partition wall that extends over all of said inlet ports, all of said inlet ports being disposed in-line of all of said cylinders of said given bank of cylinders;

two resonance pipes, a respective one of which is associated with and disposed within each of said resonance tanks; each of said resonance pipes having an outlet opening located along a common plane, which opens into its associated resonance tank, and an inlet opening located along a common plane, which communicates with the discharge side of said supercharging device for receiving fresh gas therefrom; of each of said resonance pipes having an effective length corresponding to at least eight times a diameter of a circle having a circular which is equivalent to that of of said resonance pipe; said resonance tanks and said resonance pipes extending in a common direction along a longitudinal axis of said engine, with the inlet ports being open to their respective resonance tank along a plane extending between said resonance pipes which contains said common partition wall; and supply means, in a form of at least one supply cover, to establish said communication with low-loss flow conditions between said supercharging device and said inlet openings of said resonance pipes, so that fresh gas can be delivered from said supercharging device to said resonance pipes with need for a plenum tank being eliminated and with introduction of the resonance pipes as well as the supply of the fresh gas being facilitated.

2. An intake system according to claim 1, which includes a single supply cover for both of said resonance pipes, with both of said inlet openings of said resonance pipes being disposed on a common side of said bank of cylinders.

3. An intake system according to claim 1, in which said resonance pipes extend linearly.

4. An intake system according to claim 1, in which said inlet and outlet openings of said resonance pipes are flared.

5. An intake system according to claim 1, in which each of said resonance tanks has a region in the vicinity of said outlet opening of the associated resonance pipe for deflecting flow of fresh gas exiting from said pipe; and in which said resonance tanks which extend over all of said inlet ports have a greater cross-sectional area in vicinity of their flow-deflection region than they do downstream of said deflection region.

6. An intake system according to claim 1, which is applicable for each of two banks of cylinders of V12 engines.

7. An intake system according to claim 1, in which each of said resonance pipes is supported in its associated resonance tank via a sliding fit in a region of its inlet opening, and via a fixed fit in a region of its outlet opening.

8. An intake system according to claim 7, in which said fixed fit is in a form of a simple screwed joint 9. An intake system according to claim 1, in which said two resonance tanks are combined in a single resonance casing.

10. An intake system according to claim 9, in which said supply cover is disposed parallel to said inlet openings of said resonance pipes, and in a gastight manner on an inlet end of said casing.

11. An intake system according to claim 9, which said common partition wall divides said resonance casing into said two resonance tanks.

12. An intake system according to claim 11, in which said common partition wall between said two resonance tanks extends substantially parallel to the longitudinal axis of said engine over the length of all six of said inlet ports, and is guided around said inlet ports in such a way as to effect said communication of a given one of said resonance tanks with said inlet ports of three adjacent cylinders.

* * * * *